United States Patent [19]

Zürner et al.

[11] 4,401,071

[45] Aug. 30, 1983

[54] INJECTION AND MIXTURE FORMATION PROCESS AND APPARATUS TO IMPLEMENT SAME

[75] Inventors: Hans-Jürgen Zürner, Ammerndorf; Wolfram Emmerling; Werner Steimer, both of Nuremberg, all of Fed. Rep. of Germany

[73] Assignee: M.A.N. Maschinenfabrik Augsburg-Nürnberg Aktiengesellschaft, Nuremburg, Fed. Rep. of Germany

[21] Appl. No.: 223,123

[22] Filed: Jan. 7, 1981

[30] Foreign Application Priority Data

Jan. 31, 1980 [DE] Fed. Rep. of Germany ....... 3003411

[51] Int. Cl.³ .............................................. F02B 23/06
[52] U.S. Cl. .................................. 123/276; 123/261; 123/262; 123/295
[58] Field of Search ............... 123/276, 279, 261, 262, 123/263, 281, 295

[56] References Cited

U.S. PATENT DOCUMENTS

| Re. 24,851 | 8/1960 | Buchi | 123/276 |
| 2,125,293 | 8/1938 | Hesselman | 123/276 |
| 2,305,801 | 12/1942 | Wiebicke | 123/276 |
| 3,094,947 | 6/1963 | Barber | 123/276 |
| 3,195,520 | 7/1965 | Simko | 123/276 |
| 3,315,650 | 4/1967 | Bishop et al. | 123/279 |

Primary Examiner—Charles J. Myhre
Assistant Examiner—Andrew M. Dolinar
Attorney, Agent, or Firm—Kontler, Grimes & Battersby

[57] ABSTRACT

The invention sets forth a method and apparatus for improving the injection and mixture of fuel and air in air-compressing combustion engines. The fuel is admitted into a rotationally symmetrical combustion chamber in such a manner that all droplets of the fuel stream are finely atomized at all speed and/or load ranges of the engine, and that the complete spray on entering the combustion chamber is so broken up that, from the combustion chamber wall to a point approximately one third of the combustion chamber radius, the broken-up spray matches the combustion chamber geometry, the injection of the fuel being effected in such a manner as to match the velocity and/or density distribution of the combustion air which rotates in the combustion chamber.

8 Claims, 8 Drawing Figures

INJECTION AND MIXTURE FORMATION PROCESS AND APPARATUS TO IMPLEMENT SAME

BACKGROUND OF THE INVENTION

The invention relates to an injection and mixture formation process as well as apparatus to implement same for air-compressing internal combustion engines provided in the piston crown with a rotation-symmetrical combustion chamber in which the air for combustion to be inducted is imparted a rotation about the longitudinal axis of the combustion chamber and the fuel is injected by a fuel injector arranged in the region of the combustion chamber rim in the cylinder head at an angle relative to the longitudinal axis of the combustion chamber and substantially in the direction of the rotating air for combustion.

In the case of air-compressing, direct-injection internal combustion engines, a number of injection and mixture formation processes as well as suitable equipment have been developed in the course of many years which, however, all have lesser or greater merits and demerits. Many of these processes were abandoned after a short while on account of great disadvantages so that only a few classical injection processes are looked upon as trend-setting by today's engineering world.

One of these concepts, for instance, provides for the fuel to be injected through a nozzle arranged centrally or substantially centrally relative to the combustion chamber opening in the form of a plurality, or at least three, sprays radially outwards into the air for combustion contained in the combustion chamber. This air for combustion has no, or nearly no, controlled swirl flow imparted to it on entering, turbulence being produced only by the squish effect, mainly in constricted or even omega-shaped combustion chambers. Multi-spray injection into this squish turbulence results in a more or less good mixture preparation and, consequently, combustion under uncontrolled flow conditions. It must be looked upon as a further disvantage that, after initial ignition, spontaneous, rough and noisy combustion occurs because there are many fuel particles which, on account of the short time they have spent in the compressed air, have not yet been sufficiently heated and/or evaporated. Generally, the rates of pressure rise $d_p$ measured in internal combustion engines of this type at full load range from 6 to 8 bar per degree crank angle. In the part-load range, the ratio $d_p/d\alpha$ is even greater or at least equal to 8 bar/° crank angle which leads to the well-known phenomenon of Diesel pinking.

The engines have only medium loadability at the smoke limit, fuel economy is moderate because relatively high flow losses occur and fuel preparation is not at an optimum. At low loads and/or speeds as well as during starting, the fuel tends to impinge on the combustion chamber wall almost perpendicularly because of the short trajectories of the fuel whereby gases are formed which have an unpleasant odour and cause irritation of the eyes. There is a high emission level of unburnt hydrocarbons (Swiss Patent Specification 175 433).

Another injection process known provides for a comparatively moderate rotary motion about the longitudinal axis of the combustion chamber to be imparted to the air for combustion flowing into the combustion chamber. Fuel injection is also by means of a plurality of sprays which extend across the air flow radially outwards from a nozzle arranged centrally relative to the combustion chamber. The combustion chamber is mostly formed with a shallow shape and has hardly any constriction at the combustion chamber rim.

After initial ignition, there is also a spontaneous, rough and noisy combustion in this type of engine, because too large an amount of ignitable mixture already exists in the combustion chamber at the time of ignition. Generally, the rates of pressure rise are similar to the first-described process, viz $d_p/d\alpha = 6$ to 8 bar/° crank angle in the full load range
and $dp/d\alpha > 8$ bar/° crank angle at part load, so that the problem of Diesel pinking is again not overcome. Admittedly, loadability at the smoke limit is relatively good because the process allows more intensive controlled mixing of the fuel and air for combuction. Fuel efficiency and fuel economy can also be described as good because only small total flow losses occur thanks to the generation of the air swirl and the small squish flow losses at the combustion chamber rim. Heat transfer losses at the combustion chamber wall, too, as a result of the comparatively low air swirl have to be considered to be low. During operation in the low load and/or speed range as well as during starting, the same kind of drawbacks occur, however, as in the previously described process.

Also known from the German Patent Specification 964 647 or the German Patent Specification 969 826 is an internal combustion engine where the piston crown is formed with a combustion chamber in the shape of a solid of rotation with a constricted throat into which fuel is injected at an angle by a nozzle arranged laterally at the combustion chamber rim. There is no controlled air flow provided and squish flow and atomization by the nozzle are relied upon for the mixing of the fuel with the air for combustion, therefore, the same drawbacks occur as described above.

Finally, the injection and mixture formation processes to be distinguished in general include the process of wall deposition of the fuel (German Patent Specification 865 683). This process preferably uses a spherically shaped combustion chamber with a constricted combustion chamber rim and the fuel is applied by a nozzle located off-centre relative to the combustion chamber by one or more sprays onto the combustion chamber wall where it is spread as a thin film by the kinetic energy and by the air swirl prevailing in the combustion chamber. In particular due to the hot combustion chamber wall, it is evaporated and then intimately mixed with the air for combustion.

After initial ignition, continuous evaporation of additional fuel from the wall results in a smooth and low-noise combustion which is borne out by the fact alone that a value of $d_p/d\alpha = 3$ to 4 bar/degree crank angle is obtained at full load. At part load, this value is even lower so that pinking is prevented from occurring.

The intensive mixture formation permits good loadability at the smoke limit and high fuel efficiency, but there is a penalty of higher flow losses due to the high air swirl (50% higher than in direct-injection internal combustion engines) and due to the squish turbulence at the combustion chamber rim. Furthermore, the high-intensity air swirl results in high thermal losses to the combustion chamber wall, especially in the area of the constricted throat whereby the latter and also the cylinder head are subjected to high thermal stresses.

In the low load and/or speed range as well as during starting when the combustion chamber wall is still cold or relatively cold, the fuel deposited on the wall can only insufficiently be evaporated which results in incomplete combustion with unpleasantly smelling exhaust gases forming and the emission of unburnt hydrocarbons. The adoption of a longer free trajectory of the fuel as proposed by the German Patent Specification 20 38 048 failed to overcome the drawbacks completely.

SUMMARY OF THE INVENTION

This is the starting point of the present invention which has for its object to provide a process and apparatus required for its implementation enabling the drawbacks besetting the individual known processes to be largely avoided and their specific advantages to be combined. In other words, a new engine is proposed to afford smooth and quiet running, little exhaust discoloration, a good loadability at the smoke limit and a high fuel efficiency both when running cold and in the warmed-up condition.

According to the invention, this object is achieved in as far as the process is concerned in that, by a suitable design of the spray hole or spray holes in the fuel injection nozzle and by producing an adequate pressure at the spray hole or spray holes, the individual fuel droplets of the spray or sprays emitted are finely atomized in all speed and/or load ranges of the engine, in that the complete fuel spray on entering the combustion chamber is broken up in a manner that it matches the combustion chamber geometry from the combustion chamber wall up to about one third of the combustion chamber radius, and in that injection of the fuel is effected under conditions matching the velocity and/or density distribution of the air for combustion rotating in the combustion chamber.

Thus, great value is attached to ensuring by a suitable design of the spray hole or spray holes that already when the fuel is emitted from the injection nozzle the spray or sprays consist of as finely atomized droplets as possible which essentially is possible in all speed and/or load ranges of the engine only by maintaining the pressure at the spray hole or spray holes as constant as possible and at a relatively high level. Means for this are known. The fine droplets in the spray pattern are in this manner more readily entrained by the air swirl—with wall deposition largely avoided—brought to an adequate evaporation temperature and, eventually, mixed with the air for combustion.

Breaking up of the fuel spray or fuel sprays and matching the spray or sprays to the combustion chamber geometry ultimately effects intimate mixing and uniform distribution in the air for combustion so that only the centre of the combustion chamber remains practically free from fuel in order to allow space for the burnt gases before they are discharged from the combustion chamber. This goes a long way towards ensuring controlled combustion where the mixture is separated from the burnt gases. The injection of the fuel under conditions matching the velocity and/or density distribution of the air for combustion rotating in the combustion chamber ultimately results in a near ideal distribution of the fuel in the air for combustion.

Thanks to the process of fuel preparation with at least partial evaporation in the air for combustion before mixing with the latter it is possible to obtain good performance in all operating ranges of the engine and no starting trouble is liable to be encountered either. The ratio $d_p/d\alpha$ equals 3.5 to 4 bar/° crank angle at full load which is tantamount to a smooth inception and progress of combustion. Since this value does not increase in the part load range either, Diesel pinking does not occur. Finally, mention should be made of the good fuel economy as a result of the controlled progress of combustion and the low level of flow and/or heat losses.

As a further development of the process according to the invention, it is proposed that the fuel be introduced into a shallow, cup-shaped combustion chamber in a manner that the centreline of the broken-up fuel spray or main fuel spray—viewed in plan—forms a tangent to a circle whose diameter is 0.6 to 0.7 times the diameter of the combustion chamber and that, viewed in projection, the spray or main fuel spray extends at an angle of 40° to 50° or, where two-hole injection nozzles are used, 35° to 50° maximum obliquely to the longitudinal axis of the combustion chamber.

The adoption of a shallow cup-shaped combustion chamber without any appreciable constriction is best for implementing the process, squish turbulence and, consequently, flow losses, being small and the combustion chamber being subjected to no thermal overstressing, i.e. overheating.

The free trajectory of the main fuel spray entrained by the air swirl is preferably chosen greater than or, at the most, equal to 0.8 times the diameter of the combustion chamber whereby combustion takes place very smoothly and the total spray cone angle of the fuel spray should be between 35° and 45°.

Finally, as a further development of the process according to the invention, it is also proposed that, with fully open inlet valves and a mean axial piston speed of 10 m/sec., the revolving frequency of the air for combustion in the cylinder—based on the reference diameter (0.7 times piston diameter)—is 130 to 155 Hz and, in the case of supercharged internal combustion engines, 140 to 165 Hz.

Referring to the apparatus put forward to implement the process according to the invention, it is proposed that the ratio of combustion chamber diameter to piston diameter be between 0.44 and 0.5, that the ratio of combustion chamber depth to combustion chamber diameter be 0.55 to 0.63, and that the combustion chamber diameter be increased towards the substantially flat combustion chamber bottom to a maximum diameter by having the combustion chamber wall inclined at an angle of 4° to 7° to the longitudinal axis of the combustion chamber to produce a steady taper. The transition from the combustion chamber wall to the combustion chamber bottom is preferably formed by a radius with the ratio of radius to combustion chamber diameter being 0.2 to 0.25.

Such combustion chambers, it has been found, lend themselves very well to the three-dimensional distribution of the fuel in the manner described, although other combustion chamber variants may be used. The number of spray holes in the fuel injection nozzle, obviously, depends greatly on the shape and size of the combustion chamber, therefore, the invention does not specify a definite number. If, for instance, a single-hole nozzle is used which permits the necessary spray pressure and the necessary breaking up or atomization of the spray, it is recommended according to the invention that the ratio of spray hole diameter to spray hole length be between 0.55 and 0.75. Where it appears practicable, in view of the combustion chamber shape or for other reasons, to use a two-hole or multi-hole nozzle, it appears desirable to proportion the spray hole areas in a manner that one main fuel spray plus one or more secondary sprays are formed which are at a ratio between 4:1 and 2:1, with approx. 5° to 10° of the total break-up angle of 35° to 45° being formed by the secondary spray or sprays.

Reference is made for details of the invention to the following description of two typical embodiments of the invention illustrated in the drawings.

DESCRIPTION OF PREFERRED EMBODIMENTS

Figure 1:
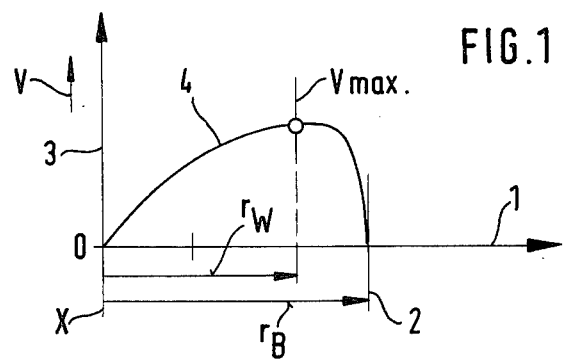
FIG. 1 is a graph plotting the velocity of the rotating air for combustion in the combustion chamber of an internal combustion engine against the radius of the combustion chamber.

Referring to FIG. 1, the abscissa 1 represents the combustion chamber radius $r_B$ which extends from the centre x (longitudinal axis of combustion chamber) to the combustion chamber wall 2. Plotted on the ordinate 3 is the peripheral velocity v of the air for combustion rotating in the combustion chamber. It can be seen from what would be an exaggerated curve 4 that this peripheral velocity is zero on account of friction directly at the combustion chamber wall 2 and, for reasons which need not be explained in detail, zero at the centre x of the combustion chamber. The maximum peripheral velocity $v_{max}$ occurs at a distance $r_w$ from the centre x of the combustion chamber which corresponds to approx. 0.6 to 0.7 times the radius $r_B$ of the combustion chamber. The maximum density of the rotating air for combustion occurs at any rate between $v_{max}$ and the combustion chamber wall 2, therefore, the fuel quantity injected will reach its maximum value at $v_{max}$ and in the following range which, however, will occur almost automatically because the fuel injected at $v_{max}$ will at any rate be deflected slightly by the centrifugal force in the direction towards the combustion chamber wall. The decisive factor in this type of fuel injection is, however, that the fuel droplets are so finely atomized from the start that they are not forced against the combustion chamber wall 2. In order to achieve this, the ratio of the spray hole diameter to spray hole length in the case of a single-hole nozzle is selected between 0.55 and 0.75 and care is taken that the pressure at the spray hole is maintained substantially constant and sufficiently high in all operating ranges of the engine.

Figure 2:
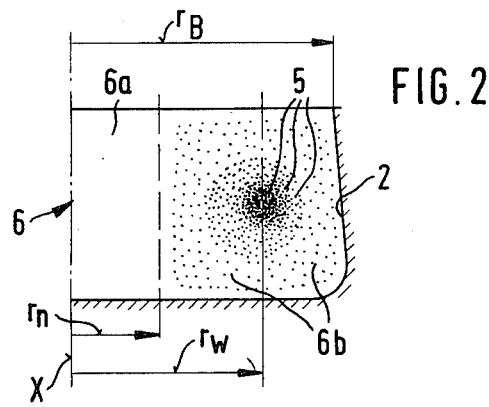
FIG. 2 is a longitudinal section through one half of the combustion chamber such as may be applied in the present instance in which the density distribution of the fuel injected into the air for combustion is schematically shown when the main fuel spray has a given free trajectory.

In the half of the combustion chamber shown in FIG. 2 it is schematically shown how the fuel 5 injected is distributed by fine atomization and breaking-up of a single-fuel spray during the mixture formation phase. Around the centre or, rather, about the longitudinal axis x of the combustion chamber 6, there is a zone 6a forming which practically contains only air for combustion or, respectively, burnt gases after combustion. This zone 6a is delimited by a circle with the radius $r_n$ which is equal to approximately one third of the combustion chamber radius $r_B$. In the remainder 6b of the combustion chamber 6, the fuel droplets 5 are distributed and (the pattern of distribution) perfectly matches the combustion chamber geometry. An exception is the zone which is situated at a distance $r_w$ from the longitudinal axis x of the combustion chamber 6. It is there where the maximum peripheral velocity of the air for combustion exists and adjacently, towards the combustion chamber 2, also the greatest density. Obviously, more fuel is injected into this zone. Consequently, the fuel distribution shown in the illustration will be obtained.

Figure 2A:
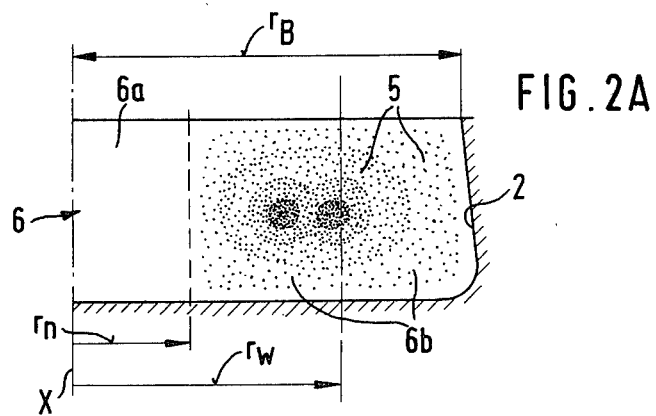
FIG. 2a is a longitudinal section as in FIG. 3 in which the combustion chamber has a greater diameter and the fuel is injected by means of two sprays.

If the fuel is injected into a shallow combustion chamber or into a combustion chamber 6 with a relatively great radius $r_B$, it is preferable to provide a main fuel spray plus one or a plurality of secondary sprays as shown in FIG. 2a. Apart from this, the same pattern of mixture formation as in FIG. 2 will be obtained.

Figure 3:
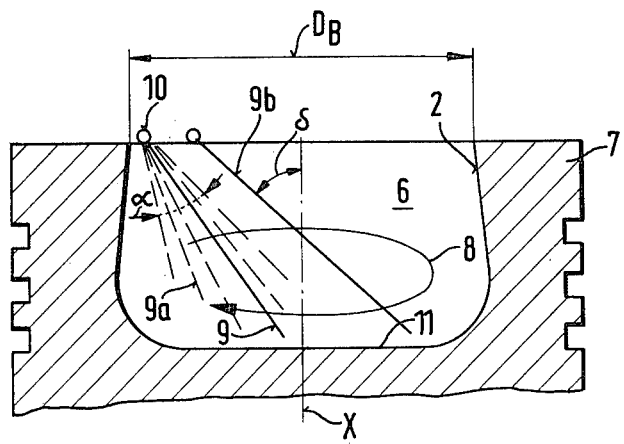
FIG. 3 is a longitudinal section through the upper part of the piston with a combustion chamber according to the invention and fuel injection through one spray hole only.
Figure 4:
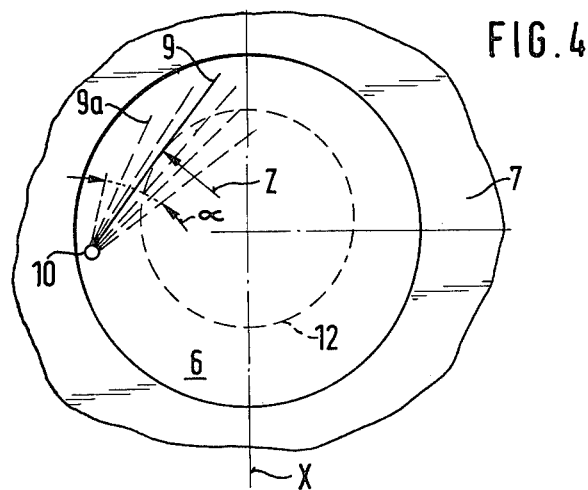
FIG. 4 is a plan view of the piston according to FIG. 3.

It is schematically shown in FIGS. 3 and 4 how fuel injection into the combustion chamber 6 provided in the piston 7 is effected with only one fuel spray. The air swirl is indicated by an arrow 8. The direction of the fuel spray or, rather, its centre line is designated by the numeral 9 and atomization of the fuel spray 9 according to FIG. 2 is schematically shown only by the dashed lines 9a. The decisive point is that one should recognize that the centre line of the fuel spray 9 penetrates from the spray hole 10 to a point close to the combustion chamber bottom 11 until it is completely disintegrated and that it forms a tangent to a circle 12 which is 0.6–0.7 times the combustion chamber diameter $D_B$. If one draws the centre line of the fuel spray 9 in a projection from the direction z in FIG. 4, the line 9b shown in FIG. 3 is obtained which extends at an angle δ of 40° to 50° relative to the longitudinal axis x of the combustion chamber. The length of this projection 9b is at least 0.8 times the combustion chamber diameter $D_B$. Finally there is the total spray cone angle α of the fuel spray 9 shown schematically which is between 35° and 45°.

Figure 5:
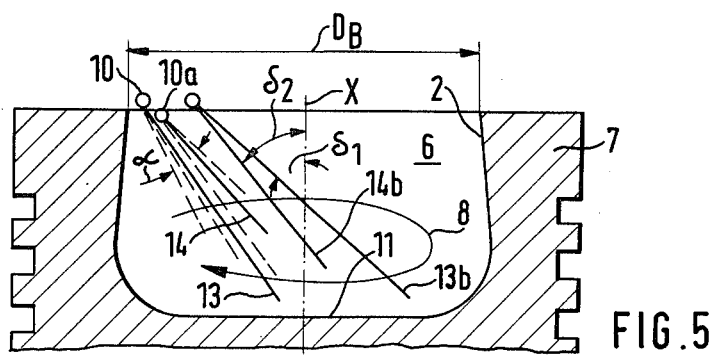
FIG. 5 is a longitudinal section through the piston shown in FIG. 3 with fuel injection by means of two spray holes.
Figure 6:
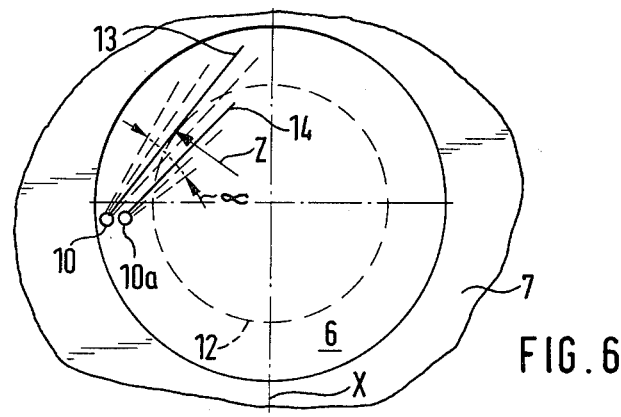
FIG. 6 is a plan view of the piston according to FIG. 5.

FIGS. 5 and 6 show the same combustion chamber 6 as in FIGS. 3 and 4, except that fuel injection is through a nozzle which has two spray holes 10, 10a of which spray hole 10 produces the main fuel spray 13 and spray hole 10a a secondary spray 14. The cross-sectional areas of the spray holes 10, 10a are at a ratio of 4:1 to 2:1, the total break-up angle α remaining between 35° and 45°, with about 5° to 10° being formed by the secondary spray 14. Drawing the centre lines of the main fuel spray 13 and the secondary spray 14 in a projection from direction z in FIG. 6, one obtains the lines 13b and 14b shown in FIG. 5, the centre line of the main fuel spray 13b sloping at an angle $δ_1$ of 40° to 50° and that of the secondary spray 14b at an angle of $δ_2$ between 35° and 45° to the longitudinal axis x of the combustion chamber. The centre line of the secondary spray 14 which is not tangent to the circle 12 (0.6 to 0.7.$D_B$) obviously has less penetration force and, in fact, need not have more, because a lower peripheral velocity and also density of the air for combustion prevails in its injection range.

Figure 7:
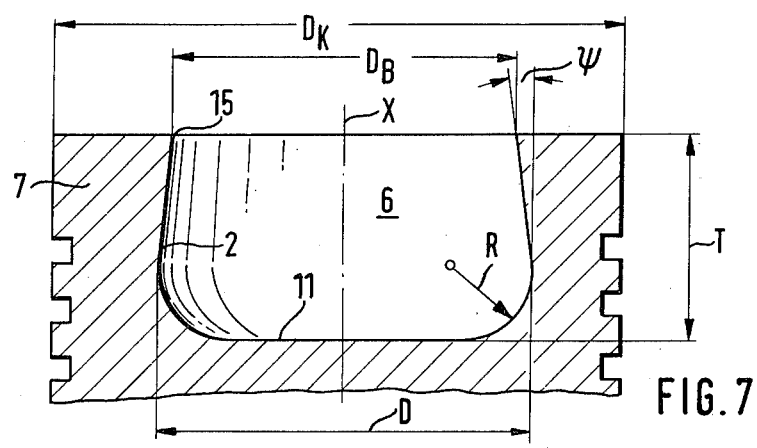
FIG. 7 is a longitudinal section through the upper part of a piston with a combustion chamber of the type proposed by the invention as ideal.

FIG. 7 which again shows a combustion chamber is intended to provide a general reference as to which dimensions a combustion chamber according to the invention should have. This appears necessary because the process appears specially suitable for such a combustion chamber. The combustion chamber 6 is again located in the crown of the piston 7 and is substantially of cup shape. The ratio of the combustion chamber diameter $D_B$ to the piston diameter $D_K$ is between 0.44 and 0.5, with $D_B$ being intended to be the combustion chamber diameter at the combustion chamber rim 15. The total combustion chamber depth T is also at a predetermined ratio relative to the combustion chamber diameter $D_B$, it being intended that this ratio be in between 0.55 and 0.63. The combustion chamber bottom 11 is predominantly horizontal. The combustion chamber 2 is inclined relative to the longitudinal axis x of the combustion chamber so that it steadily tapers out in the direction towards the combustion chamber bottom 11 at an angle $\psi$ of 4° to 7°, so that the maximum combustion chamber diameter D is actually near the combustion chamber bottom 11. Finally, it should be mentioned that the transition from the combustion chamber wall 2 to the combustion chamber bottom 11 is formed by a radius R which, relative to the combustion chamber diameter $D_B$ is at a ratio of 0.2 to 0.25.

Summarizing, the individual relationships of the dimensions will be briefly shown by the following formulae:

$D_B/D_K = 0.44$ to 0.5
$T/D_B = 0.55$ to 0.63
$\psi = 4°$ to 7°
$R/D_B = 0.2$ to 0.25

We claim:

1. Process for introducing and mixing combustion air and fuel in air compressing, self-igniting, internal combustion engines having a piston crown formed with a rotation-symmetrical combustion chamber having a substantially flat bottom wall and a circumferential side wall, the inner diameter of said chamber increasing in a direction toward said bottom wall, in which combustion air is caused to be rotated about a longitudinal axis of the combustion chamber, and wherein a cylinder head is provided with a fuel injection nozzle in the region of a rim of the combustion chamber at an angle relative to said longitudinal axis and substantially in the direction of rotation of the combustion air, comprising the steps of injecting at least one spray of fuel into said chamber in the direction of air rotation and, in such a manner, that the individual droplets of fuel in said spray are finely atomized in all operating ranges of the engine and a substantially fuel-free zone is formed at the center of said combustion chamber, the radius of said zone being approximately one-third the radius of said chamber; and effecting a break-up of said at least one spray in such a manner that the broken-up spray is distributed throughout the zone between said fuel-free zone and said side wall and surrounding said fuel-free zone and generally conforms to the geometry of said side wall of said chamber.

2. Injection and mixture formation process as in claim 1, wherein—viewed in a longitudinal section through the combustion chamber—the entire air for combustion is enriched with fuel from said side wall up to approximately one third of the combustion chamber radius ($r_n$) between the combustion chamber bottom wall and the combustion chamber rim.

3. Injection and mixture formation process as in claim 1 wherein the fuel is introduced into the combustion chamber in a manner that the centre of the broken-up fuel spray—viewed in plan looking on the combustion chamber—forms a tangent to a circle whose diameter ($2 \times r_w$) amounts to 0.6 to 0.7 times the combustion chamber diameter ($D_B$), and in that, viewed in projection, the fuel spray extends at an angle ($\delta$) of 40° to 50° relative to said longitudinal axis.

4. Injection and mixture formation process as in claim 3, wherein a free trajectory of said fuel spray entrained by the rotating air is at least equal to 0.8 times the combustion chamber diameter ($D_B$).

5. Injection and mixture formation process as in claim 4, wherein the total spray cone angle ($\alpha$) of the fuel spray is between 35° and 45°.

6. Injection and mixture formation process as in claim 1 wherein the fuel is introduced into the combustion chamber through a two-hole nozzle producing a main and a secondary fuel spray and in such a manner that the center of the broken-up main fuel spray, viewed in plan looking on the combustion chamber, forms a tangent to a circle whose diameter ($2 \times r_w$) amounts to 0.6 to 0.7 times the combustion chamber diameter ($D_B$), and when viewed in projection, the main fuel spray extends at an angle ($\delta$) of between 40° and 50° relative to the longitudinal axis of the combustion chamber.

7. Injection and mixture formation process as in claim 1 wherein the rotating frequency of the air for combustion in the cylinder is between 130 and 155 $H_z$.

8. Injection and mixture formation process as in claim 1 wherein the rotating frequency of the air for combustion in the cylinder of supercharged internal combustion engines is between 140 and 165 $H_z$.

* * * * *